United States Patent [19]

Hayashi

[11] Patent Number: 4,512,298

[45] Date of Patent: Apr. 23, 1985

[54] ENGINE LUBRICATING SYSTEM

[75] Inventor: Isao Hayashi, Yokohama, Japan

[73] Assignee: Nissan Motor Company, Limited, Yokohama, Japan

[21] Appl. No.: 438,358

[22] Filed: Oct. 21, 1982

[30] Foreign Application Priority Data

Dec. 9, 1981 [JP] Japan .............................. 56-198165

[51] Int. Cl.³ ............................................ F01M 11/10
[52] U.S. Cl. ............................ 123/196 R; 123/196 S; 123/90.33; 184/6.5; 184/6.24
[58] Field of Search ........... 123/196 R, 196 A, 196 S, 123/90.33–90.34, 196 AB; 184/6.9, 6.5, 6.24, 6.25

[56] References Cited

U.S. PATENT DOCUMENTS

| | | | |
|---|---|---|---|
| 2,425,700 | 8/1947 | LeClair | 184/6.24 |
| 2,639,783 | 5/1953 | Kovacs | 184/6.24 |
| 2,919,767 | 1/1960 | Haas | 184/6.24 |
| 2,979,160 | 4/1961 | Haas | 184/6.24 |
| 3,782,357 | 1/1974 | Kuhn et al. | 123/90.33 |

Primary Examiner—E. Rollins Cross

[57] ABSTRACT

An engine lubricating system of an internal combustion engine, comprising lubricating oil delivery means for delivering lubricating oil under controlled pressure when the engine is in operation, the lubricating oil delivery means comprising a primary filter unit having included therein a porous filter medium having perforations of a first range of sizes, first lubricating means communicating with the lubricating oil delivery means through a first oil feed passageway and operable for circulating oil from the lubricating oil delivery means to the power producing mechanism of the engine, and second lubricating means communicating with the lubricating oil delivery means through a second oil feed passageway and operable for circulating oil from the lubricating oil delivery means to the valve drive mechanism of the engine, the second lubricating means comprising a secondary filter unit having included therein a porous filter medium having perforations of a second range of sizes smaller than the first range of sizes.

6 Claims, 1 Drawing Figure

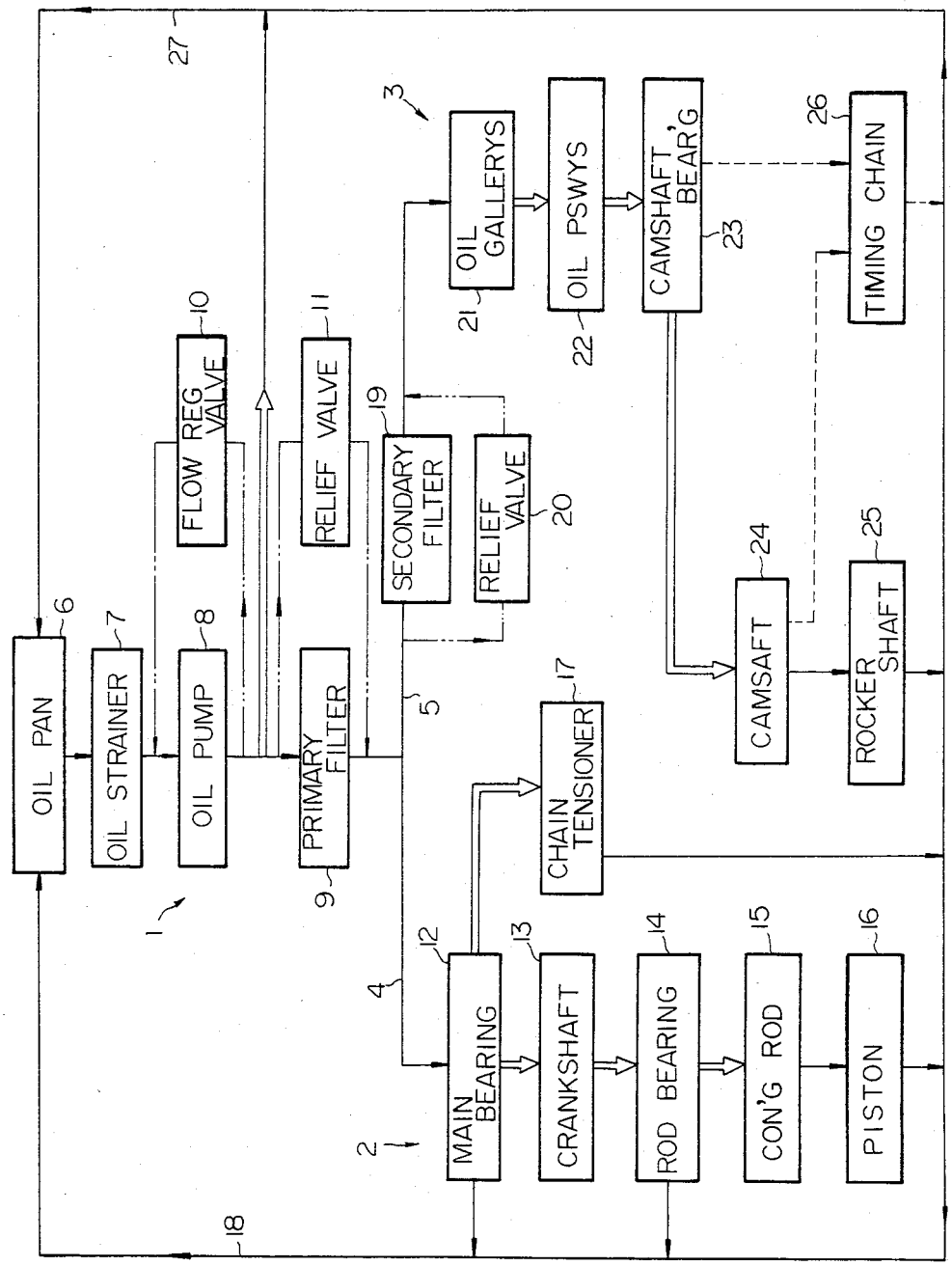

ENGINE LUBRICATING SYSTEM

FIELD OF THE INVENTION

The present invention relates to an engine lubricating system of an automotive internal combustion engine such as a diesel engine.

BACKGROUND OF THE INVENTION

An engine lubricating system of an internal combustion engine such as a diesel engine is usually such that oil is drawn from an oil pan to an engine-driven oil pump and is circulated to the power producing and valve drive mechanisms of the engine through a filter unit provided downstream of the pump. An engine lubricating system of this nature is shown in, for example, "Weekly Service Bulletin" (page 345), issued October 1977 by Nissan Motor Company. The filter unit used in such an engine lubricating system is adapted to remove relatively large particles of, for example, casting sand and swarf from the oil passed therethrough. The filter unit thus has a filter medium having perforations measuring about 15 to about 20 microns in width, length and/or diameter. If particles of carbon produced by the combustion of fuel in the diesel engine and measuring about 5 angstrom to about 10 microns in diameter are mixed with the oil delivered from the oil pump, the particles are permitted to pass through the filter unit and to reach the surfaces of the various movable and/or rotatable members and elements such as the timing cams and the rocker arms forming part of the valve drive mechanism of the engine. The carbon particles deposited on these members and elements promote abrasion of the members and elements and thus result in creation of noises and vibrations and in failure of the intake and exhaust valves to open and close at correct timings. If the filter unit of the engine lubricating system is designed to be capable of collecting carbon particles, the filter medium of the unit tends to be clogged and would fail to function properly as filter means. The present invention contemplates resolution of these problems which have thus far been encountered in engine lubricating systems of internal combustion engines.

SUMMARY OF THE INVENTION

In accordance with the outstanding aspect of the present invention, there is provided an engine lubricating system of an internal combustion engine including a power producing mechanism and a valve drive mechanism, comprising lubricating oil delivery means for delivering lubricating oil under controlled pressure when the engine is in operation, the lubricating oil delivery means comprising primary filter unit having included therein a porous filter medium having perforations of a first range of sizes; first lubricating means communicating with the lubricating oil delivery means through a first oil feed passageway and operable for circulating oil from the lubricating oil delivery means to the power producing mechanism of the engine; and second lubricating means communicating with the lubricating oil delivery means through a second oil feed passageway and operable for circulating oil from the lubricating oil delivery means to the valve drive mechanism of the engine, the second lubricating means comprising secondary filter unit having included therein a porous filter medium having perforations of a second range of sizes smaller than the first range of sizes.

BRIEF DESCRIPTION OF THE DRAWINGS

The features and advantages of an engine lubricating system according to the present invention will be more clearly appreciated from the following description taken in conjunction with the accompanying drawing which shows in the form of block diagram a preferred embodiment of an engine lubricating system according to the present invention.

DESCRIPTION OF THE PREFERRED EMBODIMENT

Referring to the drawing, an engine lubricating system embodying the present invention comprises lubricating oil delivery means 1, first lubricating means 2 and second lubricating means 3. The lubricating oil delivery means 1 communicates with the first and second lubricating means 2 and 3 through first and second oil feed passageways 4 and 5, respectively, and is adapted to deliver lubricating fluid or oil under controlled pressure to the first and second lubricating means 2 and 3 when the engine is in operation. The first lubricating means 2 is adapted to feed oil from the lubricating oil delivery means 1 to the power producing mechanism of the engine. If the internal combustion engine is of the reciprocating-piston multiple-cylinder type, the power producing mechanism herein referred to includes the crankshaft, the piston in each of the power cylinders, the connecting rod connecting the piston to the crankshaft and some members and elements which are associated with the crankshaft and the piston and which are to be subjected to sliding motion during operation of the engine. On the other hand, the second lubricating means 3 is adapted to feed oil from the lubricating oil delivery means 1 to the valve drive mechanism to drive the intake and exhaust valve train of the engine. If the internal combustion engine is of the reciprocating-piston multiple-cylinder type, the valve drive mechanism herein mentioned includes the cylinder head, the camshaft, the camshaft timing mechanism such as the gears, the combination of the endless chain and sprocket wheels or the combination of the toothed endless belt and pulleys to transmit driving power from the crankshaft to the camshaft, and some members and elements which are associated with the camshaft and which are to be subjected to sliding motion during operation of the engine. If the engine is further assumed to be of the over head-camshaft design, the valve drive mechanism further includes the rocker arm and rocker arm shaft as is well known in the art.

In the embodiment of the engine lubricating system according to the present invention, the above mentioned lubricating oil delivery means 1 comprises a source of lubricant constituted by an engine oil pan 6 usually attached to the underside of the engine cylinder block and provided with an oil strainer 7 constituted by a screen to remove particles of dirt or grit from the oil to be supplied from the oil pan 6. The lubricating oil delivery means 1 further comprises an engine oil pump 8 having a suction port communicating with the oil pan 6 through the oil strainer 7 and a delivery port communicating with a primary filter unit 9. The oil pump 8 is usually driven by the crankshaft of the engine usually through the drive shaft of the ignition distributor and delivers oil at a pressure varying with the revolution speed of the engine crankshaft. The oil pump 8 is shunted by an oil flow regulator valve 10 which is responsive to the pressure of the oil delivered from the delivery port of the oil pump 8 and which is operative to maintain the delivery rate of oil from the oil pump 8 below a predetermined value. When the delivery rate of the oil from the oil pump 8 is higher than the predetermined value, the excess of oil is fed back to the suction port of the oil pump 8 through the flow regulator valve 10. The primary filter unit 9 has an oil inlet port communicating with the delivery port of the oil pump 8 and is adapted to primarily filter the pressurized oil to be delivered from the lubricating oil delivery means 1. The primary filter unit 9 has included therein a porous filter medium having perforations measuring about 15 to 20 microns in width, length and/or diameter and is thus adapted to retain solid particles larger than such sizes. In parallel with the primary filter unit 9 is provided a relief valve 11 having oil inlet and outlet ports which are open immediately downstream and upstream, respectively, of the primary filter unit 9. The relief valve 11 is responsive to the oil pressure developed upstream of the primary filter unit 9 and is operative to maintain the pressure of the oil downstream of the primary filter unit 9 lower than a predetermined value. Thus, the relief valve 11 becomes open and provides bypass communication across the primary filter unit 9 when the oil pressure upstream of the filter unit 9 is increased to the predetermined value due to clogging of the porous filter medium included in the primary filter unit 9. The primary filter unit 9 has an outlet port communicating with the first and second lubricating means 2 and 3 through the above mentioned first and second oil feed passageways 4 and 5, respectively.

The first lubricating means 2 of the engine lubricating system embodying the present invention comprises main-bearing lubricating means 12 upstream communicating with the primary filter unit 9 through the oil feed passageway 4 for being supplied with oil from the lubricating oil delivery means 1. The main-bearing lubricating means 12 is adapted to lubricate the main bearings supporting the main journal portions of the crankshaft. The main-bearing lubricating means 12 communicates with crankshaft lubricating means 13 adapted to lubricate the crankshaft and through the crankshaft lubricating means 13 further with rod-bearing lubricating means 14 to lubricate the bearing of the connecting rod in each of the power cylinders of the engine. The rod-bearing lubricating means 14 in turn communicates with connecting-rod lubricating means 15 including an oil passageway formed in, for example, the connecting rod of each of the power cylinders and extending between piston pin on the piston and the crank pin on the crankshaft in the power cylinder. The connecting-rod lubricating means 15 thus communicates with piston lubricating means 16 to supply lubricating oil to the piston pin and onto the outer peripheral surface of the piston in each power cylinder. If the engine is of the type in which the camshaft is driven by the crankshaft through a timing chain and sprocket wheels, the above mentioned main-bearing lubricating means 12 may further communicate, in parallel with the crankshaft lubricating means 13, with chain-tensioner lubricating means 17 for lubricating the chain tensioner for the timing chain. The piston lubricating means 16 and the chain-tensioner lubricating means 17 downstream communicate with the oil pan 6 through oil return passageways 18 as shown.

On the other hand, the second lubricating means 3 of the engine lubricating system embodying the present invention comprises a secondary filter unit 19 provided in the second oil feed passageway 5 and having an oil inlet port communicating with the outlet port of the primary filter unit 9. The secondary filter unit 19 is thus adapted to further filter the oil passed through the primary filter unit 9 to the oil feed passageway 5. The secondary filter unit 19 has included therein a porous filter medium having perforations smaller than the perforations in the filter medium of the primary filter unit 9 and measuring 5 angstroms to 10 microns in width, length and/or diameter and is thus adapted to retain solid particles larger than such sizes. In parallel with the secondary filter unit 19 is provided a relief valve 20 having oil inlet and outlet ports which are open upstream and downstream, respectively, of the secondary filter unit 19. The relief valve 20 is responsive to the oil pressure developed downstream of the secondary filter unit 19 and is operative to maintain the pressure of the oil downstream of the secondary filter unit 19 higher than a predetermined value. The relief valve 20 thus becomes open and provides bypass communication across the secondary filter unit 19 when the oil pressure upstream of the secondary filter unit 19 is increased to the predetermined value due to clogging of the porous filter medium included in the secondary filter unit 19. The relief valve 20 may be constituted by a pressure-responsive check valve of a known construction. The secondary filter unit 19 has an outlet port communicating with oil gallerys 21 formed in the cylinder head of the engine and through the oil gallerys 21 further with oil passageway means 22 which includes oil passageways formed in the brackets supporting the camshaft. The oil passageway means 22 in turn communicates with camshaft-bearing lubricating means 23 to lubricate the bearings or bushings receiving the journal portions of the camshaft and further with camshaft lubricating means 24 adapted to feed oil into the oil passageways in the camshaft. If the engine is of the overhead-camshaft design and thus includes a rocker arm and a rocker arm shaft in each of the power cylinders thereof, the camshaft lubricating means 24 communicates with rocker-shaft lubricating means 25 which may include oil passageways in the rocker arm shaft and which is thus adapted to lubricate the rocker arm pivot in each of the power cylinders of the engine. If the engine is further assumed to be of the type in which the camshaft is driven by the crankshaft through a timing chain and sprocket wheels, the camshaft lubricating means 24 may further communicate, in parallel with the rocker-shaft lubricating means 25, with timing-chain lubricating means 26 adapted to lubricate the timing chain. The rocker-shaft lubricating means 25 and the timing-chain lubricating means 26 downstream communicate with the oil pan 6 through oil return passageways 27 as shown.

When, now, the engine is in operation, the oil pump 8 is driven to suck in oil from the oil pan 6 through the oil strainer 7 and the suction port of the pump 8 and delivers oil under pressure from the delivery port thereof. The oil strainer 7 serves to remove relatively large grits, if any, from the oil thus sucked in from the oil pan 6. If the delivery rate of oil from the oil pump 8 is higher than a predetermined value, the excess of oil is fed back to the oil suction port of the oil pump 8 through the flow regulator valve 10. The pressurized oil thus delivered from the oil pump 8 is passed through the primary filter unit 9, which removes solid particles of, for example, casting sand and swarf measuring about 15 to 20 microns in width, length and/or diameter from the oil delivered from the pump 8. If the oil pressure developed upstream of the primary filter unit 9 is increased to a predetermined value due to clogging of the porous filter medium included in the filter unit 9, the relief valve 11 becomes open and provides bypass communication across the filter unit 9, permitting oil to bypass the filter unit 9 by way of the relief valve 11 and preventing the engine from being starved. The pressurized oil thus passed through the primary filter unit 9 and/or relief valve 11 of the lubricating oil delivery means 1 is directed through the first and second oil feed passageways 4 and 5 to the first and second lubricating means 2 and 3, respectively.

In the first lubricating means 2, the lubricating oil directed into the first oil feed passageway 4 is first fed to the main-bearing lubricating means 12 and forms films of oil on the surfaces of the main bearings supporting the main journal portions of the crankshaft. Past the main-bearing lubricating means 12, the lubricating oil is circulated to the crankshaft lubricating means 13 and through the lubricating means 13 further to the rod-bearing lubricating means 14 and is fed to the crankshaft and the bearing of the connecting rod in each of the power cylinders of the engine. The lubricating oil is thence passed to the connecting-rod lubricating means 15 and is thus directed into the oil passageway in the connecting rod in each of the power cylinders. Past the connecting-rod lubricating means 15, the lubricating oil is directed to the piston lubricating means 16 and is thus supplied to the piston pin and onto the outer peripheral surface of the piston in each power cylinder. If the engine is of the type in which the camshaft is driven by the crankshaft through a timing chain and sprocket wheels, the lubricating oil fed to the main-bearing lubricating means 12 is passed not only to the crankshaft lubricating means 13 but to the chain-tensioner lubricating means 17 and lubricates the chain tensioner for the timing chain. From the piston lubricating means 16 and the chain-tensioner lubricating means 17, the oil is allowed to drop into or circulated through the oil return passageways 18 to the oil pan 6.

On the other hand, the lubricating oil directed from the primary filter unit 9 and or relief valve 11 of the lubricating oil delivery means 1 to the second oil feed passageway 5 of the second lubricating means 3 is passed through the secondary filter unit 19 and is thus cleared of fine solid particles, if any, which are smaller than 15 to 20 microns and which preferably measure about 5 angstroms to 10 microns in width, length and/or diameter. If the oil pressure developed at the outlet port of the secondary filter unit 19 is increased to a predetermined value due to clogging of the porous filter medium included in the secondary filter unit 19, the relief valve 20 becomes open and provides bypass communication across the secondary filter unit 19, allowing oil to bypass the secondary filter unit 19 through the relief valve 20. The lubricating oil thus passed through the secondary filter unit 19 and/or relief valve 20 is first supplied to the oil gallerys 21 formed in the cylinder head of the engine and thence to the oil passageway 60 means 22 for entering the oil passageways formed in the brackets supporting the camshaft. The lubricating oil flows through the oil gallerys 21 and oil passageway means 22 to the camshaft-bearing lubricating means 23 and by way of the lubricating means 23 to the camshaft lubricating means 24 and is fed to the bearings or bushings receiving the journal portions of the camshaft and into the oil passageways in the camshaft. If the engine is of the overhead-camshaft design, the lubricating oil circulated to the camshaft lubricating means 24 is further passed to the rocker-shaft lubricating means 25 and is thus directed into the oil passageways in the rocker arm shaft for lubricating the rocker arm pivot in each of the power cylinders of the engine. If the engine is further assumed to be of the type in which the camshaft is driven by the crankshaft through a timing chain and sprocket wheels, the lubricating oil passed through the camshaft lubricating means 24 is fed not only to the rocker-shaft lubricating means 25 but also to the timing-chain lubricating means 26 for lubricating the timing chain. From the rocker-shaft lubricating means 25 and the timing-chain lubricating means 26, the lubricating oil is allowed to drop into or circulated through the oil return passageways 27 to the oil pan 6.

As will have been understood from the foregoing description, the engine lubricating system embodying the present invention is characterized, inter alia, in that the second lubricating means 3 to lubricate the valve drive mechanism of the engine is provided with the secondary filter unit 19 downstream of the primary filter unit 9 in the lubricating oil delivery means 1. If the engine is of the type including an exhaust gas recirculation system, the carbon particles with which the lubricating oil delivered to the oil delivery means 1 may be mixed are collected by the secondary filter unit 19 so that the abrasion of the timing cam and the rocker arms as would otherwise be caused by such particles can be precluded satisfactorily. The secondary filter unit 19 thus provided in a system according to the present invention may be of a relatively small-sized and economical construction since only a portion of the oil delivered from the oil delivery means 1 is supplied to the lubricating oil delivery means 1.

What is claimed is:

1. An engine lubricating system of an internal combustion engine including a power producing mechanism including a crankshaft and a valve drive mechanism including a cylinder head, a camshaft, a camshaft timing mechanism to transmit driving power from the crankshaft to the camshaft, and members which are associated with the camshaft and which are to be subjected to sliding motion during operation of the engine, comprising, in combination, lubricating oil delivery means for delivering lubricating oil under controlled pressure when the engine is in operation, the lubricating oil delivery means comprising a primary filter unit having included therein a porous filter medium having perforations measuring about 15 to 20 microns in width, length and/or diameter;

first lubricating means communicating with the lubricating oil delivery means through a first oil feed passageway and operable for circulating oil from the lubricating oil delivery means to said power producing mechanism of the engine; and second lubricating means communicating with said lubricating oil delivery means through a second oil feed passageway and operable for circulating oil from the lubricating oil delivery means to said valve drive mechanism of the engine, the second lubricating means comprising a secondary filter unit having included therein a porous filter medium having perforations [of a second range of sizes smaller than said first range of sizes]measuring about 5 angstroms to 10 microns in width, length and/or diameter;

said second lubricating means further comprising:

oil galleries formed in the cylinder head of the engine and upstream communicating with said secondary filter unit;

oil passageway means including oil passageways formed in the brackets supporting the camshaft and upstream communicating with the oil galleries;

camshaft-bearing lubricating means upstream communicating with the oil passageway means and adapted to lubricate the bearings receiving the journal portions of the camshaft; and camshaft lubricating means upstream communicating with the camshaft-bearing lubricating means and adapted to feed oil into the oil passageways in the camshaft.

2. An engine lubricating system as set forth in claim 1, in which said valve drive mechanism further includes a rocker arm and a rocker arm shaft in each of the power cylinders of the engine, wherein said second lubricating means further comprises rocker-shaft lubricating means including oil passageways in the rocker arm shaft, the rocker-shaft lubricating means upstream communicating with said camshaft lubricating means and adapted to lubricate the rocker arm pivot in each of the power cylinders of the engine.

3. An engine lubricating system as set forth in claim 1, in which said valve drive mechanism further includes a timing chain, wherein said second lubricating means further comprises timing-chain lubricating means upstream communicating with said camshaft lubricating means and adapted to lubricate the timing chain.

4. An engine lubricating system as set forth in claim 1, in which said second lubricating means further comprises a relief valve having oil inlet and outlet ports which are open upstream and downstream, respectively, of said secondary filter unit, the relief valve being responsive to the oil pressure developed upstream of the secondary filter unit and being operative to maintain the pressure of the oil downstream of the secondary filter unit lower than a predetermined value.

5. An engine lubricating system as set forth in claim 1, in which said lubricating oil delivery means further comprises a relief valve having oil inlet and outlet ports which are open immediately downstream and upstream, respectively, of said primary filter unit, the relief valve being responsive to the oil pressure developed upstream of the primary filter unit and being operative to maintain the pressure of the oil downstream of the primary filter unit lower than a predetermined value.

6. An engine lubricating system as set forth in claim 1, in which said lubricating oil delivery means further comprises a source of lubricating oil; and an engine oil pump having a suction port communicating with the source of the lubricating oil and a delivery port and operative to deliver oil under pressure from the delivery port when the engine is in operation, the delivery port of the oil pump downstream communicating with said first and second lubricating means through said primary filter unit and said first and second oil feed passageways, respectively.

* * * * *